United States Patent
Chui et al.

(10) Patent No.: US 11,704,861 B2
(45) Date of Patent: *Jul. 18, 2023

(54) ADAPTIVE SAMPLING OF PIXELS

(71) Applicant: Outward, Inc., San Jose, CA (US)

(72) Inventors: Clarence Chui, Los Altos Hills, CA (US); Manu Parmar, Sunnyvale, CA (US)

(73) Assignee: Outward, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/539,065

(22) Filed: Nov. 30, 2021

(65) Prior Publication Data
US 2022/0084277 A1    Mar. 17, 2022

Related U.S. Application Data

(63) Continuation of application No. 16/813,646, filed on Mar. 9, 2020, now Pat. No. 11,232,624, which is a continuation of application No. 16/122,737, filed on Sep. 5, 2018, now Pat. No. 10,628,991, which is a continuation of application No. 15/081,557, filed on Mar. 25, 2016, now Pat. No. 10,109,100.

(51) Int. Cl.
  *G06T 15/06*  (2011.01)
  *G06T 17/10*  (2006.01)

(52) U.S. Cl.
  CPC .............. *G06T 15/06* (2013.01); *G06T 17/10* (2013.01)

(58) Field of Classification Search
  CPC .................................. G06T 15/06; G06T 17/10
  See application file for complete search history.

(56) References Cited

U.S. PATENT DOCUMENTS

| | | | |
|---|---|---|---|
| 8,493,383 B1* | 7/2013 | Cook .................. | G06T 15/06 345/589 |
| 2007/0139409 A1* | 6/2007 | Anderson .............. | G06T 15/06 345/426 |
| 2007/0139433 A1* | 6/2007 | Anderson ............... | G09G 5/02 345/582 |
| 2010/0134491 A1* | 6/2010 | Borland ................. | G06T 15/06 382/131 |
| 2011/0243450 A1* | 10/2011 | Liu ....................... | G06K 9/6229 382/190 |
| 2012/0213430 A1* | 8/2012 | Nutter ................... | G06T 15/50 382/162 |

(Continued)

OTHER PUBLICATIONS

Glas, J.C., and F. Van der Heijden. "The use of separated reflection components in estimating the geometrical parameters of curved surface elements." Image Processing and its Applications, 1995., Fifth International Conference on. IET, 1995.

*Primary Examiner* — Yu Chen
(74) *Attorney, Agent, or Firm* — Van Pelt, Yi & James LLP

(57) ABSTRACT

Adaptive sampling of pixels is disclosed. In some embodiments, convergence of pixels of a rendering is evaluated by removing texture from the rendering to eliminate non-convergence due to texture complexity and determining whether pixels values satisfy convergence criteria associated with pixel sampling. Those pixels of the rendering that have not converged are sampled with one or more additional samples. The completed rendering is output. Pixels of the completed rendering satisfy the convergence criteria and are not uniformly sampled.

54 Claims, 1 Drawing Sheet

(56) References Cited

U.S. PATENT DOCUMENTS

| | | | |
|---|---|---|---|
| 2013/0002671 A1* | 1/2013 | Armsden | G06T 15/50 345/426 |
| 2013/0077893 A1* | 3/2013 | Moon | G06T 5/002 382/299 |
| 2014/0029849 A1* | 1/2014 | Sen | G06T 5/50 382/167 |
| 2014/0092213 A1* | 4/2014 | Chen | H04N 21/2343 348/43 |
| 2014/0146049 A1* | 5/2014 | Ozdas | G06T 15/06 345/426 |
| 2015/0201176 A1* | 7/2015 | Graziosi | H04N 19/436 348/43 |
| 2016/0042556 A1* | 2/2016 | Imber | G06T 11/60 345/426 |
| 2016/0088316 A1* | 3/2016 | Novotny | H04N 19/117 375/240.29 |
| 2016/0321523 A1* | 11/2016 | Sen | G06T 15/06 |
| 2017/0032500 A1* | 2/2017 | Cséfalvay | G06T 5/002 |

* cited by examiner

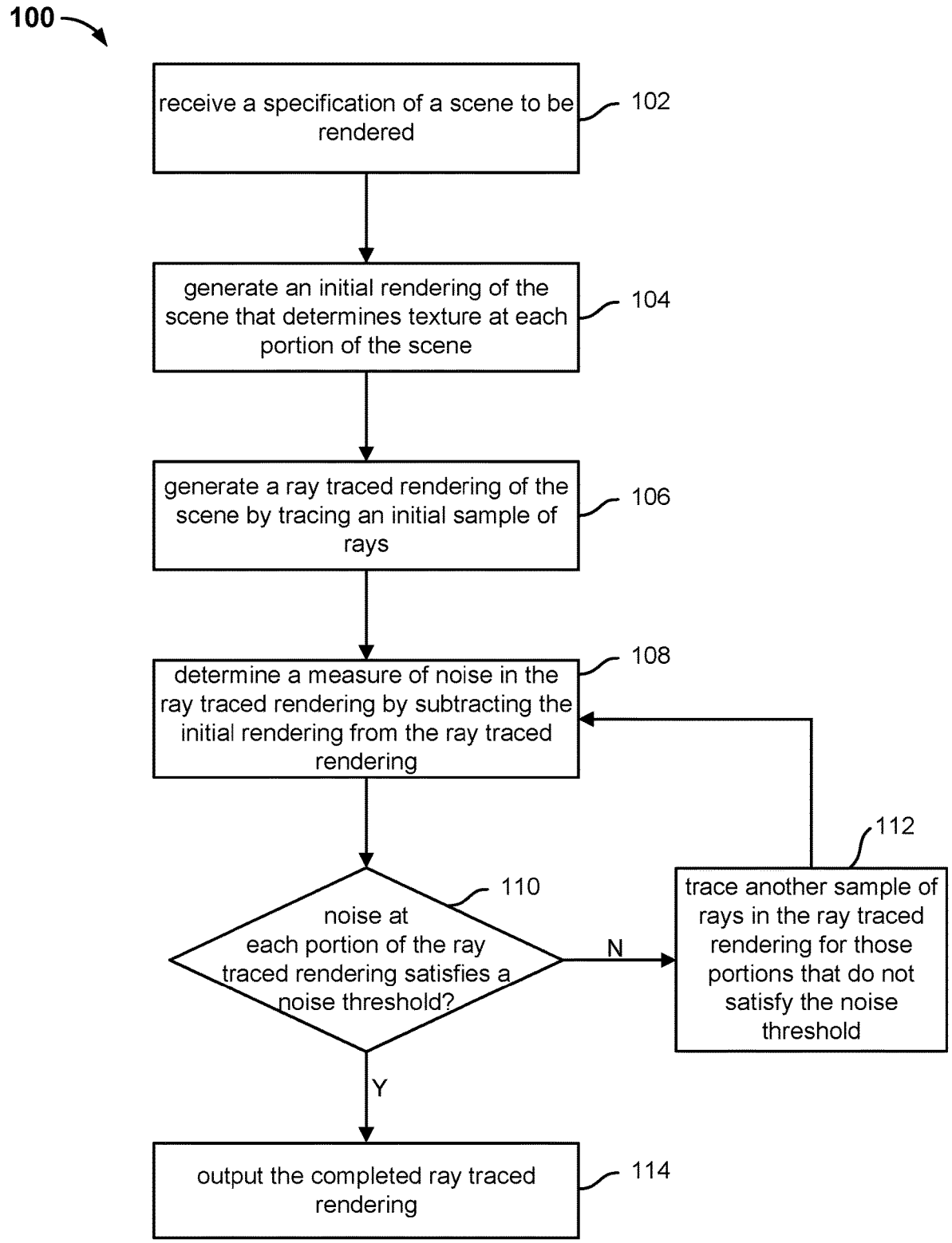

ADAPTIVE SAMPLING OF PIXELS

CROSS REFERENCE TO OTHER APPLICATIONS

This application is a continuation of U.S. patent application Ser. No. 16/813,646, now U.S. Pat. No. 11,232,624, entitled ADAPTIVE SAMPLING OF PIXELS filed Mar. 9, 2020, which is a continuation of U.S. patent application Ser. No. 16/122,737, now U.S. Pat. No. 10,628,991, entitled ADAPTIVE SAMPLING OF PIXELS filed Sep. 5, 2018, which is a continuation of U.S. patent application Ser. No. 15/081,557, now U.S. Pat. No. 10,109,100, entitled ADAPTIVE SAMPLING OF PIXELS filed Mar. 25, 2016, all of which are incorporated herein by reference for all purposes.

BACKGROUND OF THE INVENTION

In physically based rendering techniques such as path-tracing, pixels are typically uniformly sampled. Such indiscriminate sampling of pixels consumes processing resources and introduces latency that may be undesirable in many cases.

BRIEF DESCRIPTION OF THE DRAWINGS

Various embodiments of the invention are disclosed in the following detailed description and the accompanying drawings.

FIG. 1 illustrates an embodiment of a process for rendering a scene based on adaptive sampling.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying FIGURES that illustrate the principles of the invention. The invention is described in connection with such embodiments, but the invention is not limited to any embodiment. The scope of the invention is limited only by the claims, and the invention encompasses numerous alternatives, modifications, and equivalents. Numerous specific details are set forth in the following description in order to provide a thorough understanding of the invention. These details are provided for the purpose of example, and the invention may be practiced according to the claims without some or all of these specific details. For the purpose of clarity, technical material that is known in the technical fields related to the invention has not been described in detail so that the invention is not unnecessarily obscured.

In computer graphics, ray tracing is employed to render a three-dimensional scene with complex light interactions on a two-dimensional image plane. More specifically, ray tracing facilitates capturing a three-dimensional scene on an image sensor of a virtual camera viewing the scene from a particular position by tracing the paths of light rays and simulating their effects from encounters with objects comprising the scene. In order to only trace light rays that actually hit or intersect the image plane, ray tracing mathematically identifies and reproduces the path that each light ray follows in the reverse direction by tracing a path from a virtual camera position through each pixel of the image plane to its interactions with objects of the scene, including reflection, refraction, and/or shadow effects, to eventually its point of origin, i.e., a light source in the scene. Based on the determined path of each light ray and its interaction with scene objects, a corresponding pixel value (i.e., pixel color) is determined. In many cases, a plurality of samples of light rays is cast from pixels of the image plane into the scene to obtain more accurate pixel values. The path of a light ray is not deterministic but has constrained randomness. More samples of light rays through a pixel facilitate identifying a converging value for that pixel in a distribution of possible outcomes.

Uniformly sampling with a fixed number of samples per pixel is generally inefficient. In such cases, the number of samples required by pixels needing the most samples to converge is determined, and all pixels are uniformly sampled in a blanket fashion with this determined number of samples to ensure that a rendering with an acceptable quality or resolution is produced. The numbers of samples needed for convergence depend on the material properties of objects comprising a scene. Typically, optically complex materials exhibit more complicated interactions with light and thus generally require more samples to converge. For the same texture or pattern, diffused surfaces converge significantly more rapidly than shiny or specular surfaces. Thus, uniformly sampling all pixels using the same number of samples introduces substantial redundant sampling for pixels requiring considerably fewer samples to converge.

The aforementioned over sampling can be eliminated by sampling each pixel with only as many samples that are needed to achieve convergence. However, a pixel value may not converge if the pixel represents a complex pattern or texture that is inherently noisy. Thus, a noisy or non-convergent pixel value may arise from a deliberately noisy pattern or texture that the pixel represents and/or from insufficient sampling. In the case of the latter, the pixel needs to be further sampled with one or more additional rays. Over sampling can be prevented by distinguishing between noise or variance arising from texture versus from under sampling.

Adaptive sampling of pixels based on image data during ray tracing is disclosed. A scene that is desired to be rendered is not uniformly sampled during ray tracing. Rather, different portions of a scene under consideration are sampled differently. That is, pixels are sampled with different numbers of samples depending on the portions of an associated scene represented by the pixels. As further described in detail herein, an optimal number of samples for each pixel is intelligently determined based on foreknowledge of scene textures and identifying noise arising due to under sampling during ray tracing. More specifically, after each iteration (i.e., sample) of ray tracing, noise or variance in the ray traced rendering due to under sampling is identified by removing the noise or variance due to texture, and only pixels that do not satisfy a prescribed noise threshold are further sampled in one or more subsequent iterations until all pixels satisfy the prescribed noise threshold, i.e., until all pixels converge.

The given description generally describes ray tracing. However, the disclosed techniques may equivalently be employed with path tracing or any other ray based rendering technique that relies on tracing paths of light.

FIG. 1 illustrates an embodiment of a process for rendering a scene based on adaptive sampling. The rendering of the scene may comprise a still image or a frame of a video sequence. Generally, process 100 may be performed by a virtual camera having an adaptive sensor customized based on the scene being rendered. In various embodiments, process 100 may be performed by a processor coupled to a memory that provides instructions to the processor or a computer program product embodied in a non-transitory computer readable storage medium.

Process 100 starts at step 102 at which a specification of a scene to be rendered is received. For example, the scene to be rendered may comprise a view of a three-dimensional virtual environment from a particular virtual camera position and/or angle. The specification of the scene received at step 102 may comprise information about the scene such as scene content, objects, geometry, lighting, environment, textures, etc. The specification of the scene received at step 102 may further comprise a virtual camera position from which the scene is viewed.

At step 104, an initial rendering of the scene is generated that determines texture at each portion of the scene. The generated initial rendering of the scene comprises a low complexity and computational cost rendering that includes texture information but excludes advanced optical effects. In some embodiments, the initial rendering comprises a rasterization or a scanline rendering. For example, the initial rendering of the scene generated at step 104 may comprise an OpenGL (Open Graphics Library) rendering. In some embodiments, the initial rendering comprises a first intersection ray cast or traced rendering without any bounces. The initial rendering of the scene generated at step 104 comprises the correct brightness and textures but is devoid of higher order lighting effects, such as reflections, glares, shadows, etc.

At step 106, a ray traced rendering of the scene is generated by tracing an initial sample of rays. In various embodiments, the initial sample of rays may comprise one or more samples of rays. For example, in some embodiments, step 106 comprises generating the ray traced rendering by tracing a first sample of rays for each pixel. In other embodiments, it may be desirable to sample each pixel with at least a prescribed number of samples of rays. In such cases, step 106 comprises generating the ray traced rendering by tracing the prescribed number of samples of rays for each pixel.

At step 108, a measure of noise in the ray traced rendering is determined by subtracting the initial rendering of the scene from the ray traced rendering of the scene. In various embodiments, noise may be represented or measured using any appropriate metric such as variance of pixel values, visible noise in the difference image, SNR (signal-to-noise ratio), etc. Subtracting the initial rendering effectively removes texture, and, thus, any noise resulting from the texture. The noise remaining at step 108, therefore, arises from the optical properties of materials comprising the scene and their interactions with incident light. Effectively, the noise remaining at step 108 results from under sampling, i.e., from too few samples of rays.

At step 110, it is determined whether the noise at each portion of the ray traced rendering satisfies a prescribed noise threshold. That is, it is determined whether noise or variance in pixel values across one or more samples satisfies an acceptable threshold. More specifically, it is determined at step 110 whether a pixel value has converged. It is determined that a pixel value has converged when the pixel value does not substantially change (i.e., beyond the acceptable threshold) across a prescribed number of samples. Thus, it is determined at step 110 whether or not each pixel value has converged.

If it is determined at step 110 that one or more portions of the ray traced rendering do not satisfy the prescribed noise threshold, another sample of rays is traced for those portions in the ray traced rendering at step 112. That is, another sample of rays is traced at step 112 for each pixel that is found not to converge at step 110. Process 100 subsequently returns to step 108 and iterates steps 108-112 until all portions of the ray traced rendering satisfy the prescribed noise threshold, i.e., until all pixels are found to converge at step 110 according to a prescribed set of convergence criteria or conditions.

When it is determined at step 110 that all portions of the ray traced rendering satisfy the prescribed noise threshold (i.e., all pixel values have converged), the completed ray traced rendering is output at step 114, e.g., as a file or via a display. In most cases, different portions of the completed ray traced rendering that is output at step 114 are sampled with different numbers of samples of rays. Process 100 subsequently ends.

As described, a ray traced rendering is evaluated as it evolves after each sample. Specifically, an initial rendering that gives texture is subtracted out from the ray traced rendering after each sample to leave noise not originating from texture complexity but from the optical properties of materials interacting with light in the environment of the scene. Variance in the difference image diminishes with each additional sample. Different portions of the scene are affected differently with each sample. Ray tracing with additional samples is continued for only remaining noisy portions and ceased as soon as convergence occurs. Thus, an optimal number of samples of rays is employed per pixel, essentially eliminating over sampling and thus significantly reducing the processing resources needed and latency introduced during rendering.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   iteratively evaluating convergence of pixels of a rendering by removing texture from the rendering to eliminate non-convergence due to texture complexity and determining whether pixel values satisfy convergence criteria associated with pixel sampling and sampling those pixels of the rendering that have not converged with one or more additional samples during each iteration; and
   outputting the completed rendering, wherein pixels of the completed rendering satisfy the convergence criteria and wherein pixels of the completed rendering are not uniformly sampled.

2. The method of claim 1, wherein pixels of the rendering are adaptively and iteratively sampled until pixels of the rendering satisfy the convergence criteria.

3. The method of claim 1, wherein pixels of the completed rendering are sampled with different numbers of samples.

4. The method of claim 1, wherein pixels of the completed rendering are sampled with only as many samples needed to satisfy the convergence criteria.

5. The method of claim 1, wherein pixels of the completed rendering are sampled with optimal numbers of samples.

6. The method of claim 1, wherein the convergence criteria comprise a noise threshold.

7. The method of claim 6, wherein the noise threshold comprises one or more of a measure of variance, a measure of visible noise, and a measure of SNR (signal-to-noise ratio).

8. The method of claim 6, wherein the noise threshold corresponds to pixel value variance across samples.

9. The method of claim 6, wherein pixel values satisfy the noise threshold if they do not change beyond the noise threshold across a prescribed number of associated samples.

10. The method of claim 1, wherein pixel sampling is based on optical properties of materials interacting with light in an associated scene.

11. The method of claim 1, wherein removing texture comprises subtracting from the rendering a corresponding texture rendering.

12. The method of claim 11, wherein the texture rendering comprises a rasterization rendering, a scanline rendering, an OpenGL (Open Graphics Library) rendering, or a first intersection path or ray traced rendering without any bounces.

13. The method of claim 11, wherein the texture rendering is devoid of higher order optical effects.

14. The method of claim 1, wherein over sampling of pixels is prevented by distinguishing between noise arising from texture versus noise arising from under sampling.

15. The method of claim 1, wherein the samples comprise samples of rays.

16. The method of claim 1, wherein the rendering comprises a physically based rendering.

17. The method of claim 1, wherein the rendering comprises a path or ray traced rendering.

18. The method of claim 1, wherein the rendering comprises a still image or a frame of a video sequence.

19. A system, comprising:
a processor configured to:
iteratively evaluate convergence of pixels of a rendering by removing texture from the rendering to eliminate non-convergence due to texture complexity and determine whether pixel values satisfy convergence criteria associated with pixel sampling and sample those pixels of the rendering that have not converged with one or more additional samples during each iteration; and
output the completed rendering, wherein pixels of the completed rendering satisfy the convergence criteria and wherein pixels of the completed rendering are not uniformly sampled; and
a memory coupled to the processor and configured to provide the processor with instructions.

20. A computer program product embodied in a non-transitory computer readable medium and comprising computer instructions for:
iteratively evaluating convergence of pixels of a rendering by removing texture from the rendering to eliminate non-convergence due to texture complexity and determining whether pixel values satisfy convergence criteria associated with pixel sampling and sampling those pixels of the rendering that have not converged with one or more additional samples during each iteration; and
outputting the completed rendering, wherein pixels of the completed rendering satisfy the convergence criteria and wherein pixels of the completed rendering are not uniformly sampled.

21. The system of claim 19, wherein pixels of the rendering are adaptively and iteratively sampled until pixels of the rendering satisfy the convergence criteria.

22. The system of claim 19, wherein pixels of the completed rendering are sampled with different numbers of samples.

23. The system of claim 19, wherein pixels of the completed rendering are sampled with only as many samples needed to satisfy the convergence criteria.

24. The system of claim 19, wherein pixels of the completed rendering are sampled with optimal numbers of samples.

25. The system of claim 19, wherein the convergence criteria comprise a noise threshold.

26. The system of claim 25, wherein the noise threshold comprises one or more of a measure of variance, a measure of visible noise, and a measure of SNR (signal-to-noise ratio).

27. The system of claim 25, wherein the noise threshold corresponds to pixel value variance across samples.

28. The system of claim 25, wherein pixel values satisfy the noise threshold if they do not change beyond the noise threshold across a prescribed number of associated samples.

29. The system of claim 19, wherein pixel sampling is based on optical properties of materials interacting with light in an associated scene.

30. The system of claim 19, wherein removing texture comprises subtracting from the rendering a corresponding texture rendering.

31. The system of claim 30, wherein the texture rendering comprises a rasterization rendering, a scanline rendering, an OpenGL (Open Graphics Library) rendering, or a first intersection path or ray traced rendering without any bounces.

32. The system of claim 30, wherein the texture rendering is devoid of higher order optical effects.

33. The system of claim 19, wherein over sampling of pixels is prevented by distinguishing between noise arising from texture versus noise arising from under sampling.

34. The system of claim 19, wherein the samples comprise samples of rays.

35. The system of claim 19, wherein the rendering comprises a physically based rendering.

36. The system of claim 19, wherein the rendering comprises a path or ray traced rendering.

37. The system of claim 19, wherein the rendering comprises a still image or a frame of a video sequence.

38. The computer program product of claim 20, wherein pixels of the rendering are adaptively and iteratively sampled until pixels of the rendering satisfy the convergence criteria.

39. The computer program product of claim 20, wherein pixels of the completed rendering are sampled with different numbers of samples.

40. The computer program product of claim 20, wherein pixels of the completed rendering are sampled with only as many samples needed to satisfy the convergence criteria.

41. The computer program product of claim 20, wherein pixels of the completed rendering are sampled with optimal numbers of samples.

42. The computer program product of claim 20, wherein the convergence criteria comprise a noise threshold.

43. The computer program product of claim 42, wherein the noise threshold comprises one or more of a measure of variance, a measure of visible noise, and a measure of SNR (signal-to-noise ratio).

44. The computer program product of claim 42, wherein the noise threshold corresponds to pixel value variance across samples.

45. The computer program product of claim 42, wherein pixel values satisfy the noise threshold if they do not change beyond the noise threshold across a prescribed number of associated samples.

46. The computer program product of claim 20, wherein pixel sampling is based on optical properties of materials interacting with light in an associated scene.

47. The computer program product of claim 20, wherein removing texture comprises subtracting from the rendering a corresponding texture rendering.

48. The computer program product of claim 47, wherein the texture rendering comprises a rasterization rendering, a scanline rendering, an OpenGL (Open Graphics Library) rendering, or a first intersection path or ray traced rendering without any bounces.

49. The computer program product of claim 47, wherein the texture rendering is devoid of higher order optical effects.

50. The computer program product of claim 20, wherein over sampling of pixels is prevented by distinguishing between noise arising from texture versus noise arising from under sampling.

51. The computer program product of claim 20, wherein the samples comprise samples of rays.

52. The computer program product of claim 20, wherein the rendering comprises a physically based rendering.

53. The computer program product of claim 20, wherein the rendering comprises a path or ray traced rendering.

54. The computer program product of claim 20, wherein the rendering comprises a still image or a frame of a video sequence.

* * * * *